United States Patent
Gao et al.

(10) Patent No.: US 12,190,552 B2
(45) Date of Patent: Jan. 7, 2025

(54) NODE-BASED GEOMETRY AND ATTRIBUTE CODING FOR A POINT CLOUD

(71) Applicant: TENCENT AMERICA LLC, Palo Alto, CA (US)

(72) Inventors: Wen Gao, Palo Alto, CA (US); Xiang Zhang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/205,310

(22) Filed: Jun. 2, 2023

(65) Prior Publication Data

US 2023/0306651 A1    Sep. 28, 2023

Related U.S. Application Data

(63) Continuation of application No. 17/084,972, filed on Oct. 30, 2020, now Pat. No. 11,741,637.

(60) Provisional application No. 62/972,155, filed on Feb. 10, 2020.

(51) Int. Cl.
  *G06T 9/40* (2006.01)
  *G06T 15/10* (2011.01)

(52) U.S. Cl.
  CPC .......... *G06T 9/40* (2013.01); *G06T 15/10* (2013.01); *G06T 2207/10028* (2013.01)

(58) Field of Classification Search
  None
  See application file for complete search history.

(56) References Cited

U.S. PATENT DOCUMENTS

| | | | | |
|---|---|---|---|---|
| 10,694,210 | B2 * | 6/2020 | Chou | G06T 9/00 |
| 11,004,240 | B2 * | 5/2021 | Li | H04N 19/119 |
| 11,089,331 | B2 * | 8/2021 | Lasserre | H04N 19/52 |
| 11,126,887 | B2 * | 9/2021 | Li | H04N 19/186 |
| 11,882,303 | B2 * | 1/2024 | Hur | H04N 19/119 |
| 11,889,113 | B2 * | 1/2024 | Hur | H04N 19/597 |
| 2020/0151915 | A1 * | 5/2020 | Li | G06T 7/60 |
| 2020/0302651 | A1 * | 9/2020 | Flynn | G06T 3/4084 |
| 2021/0248785 | A1 * | 8/2021 | Zhang | H04N 19/17 |
| 2021/0272324 | A1 * | 9/2021 | Lasserre | H03M 7/30 |
| 2021/0335019 | A1 * | 10/2021 | Li | G06T 9/001 |
| 2021/0407147 | A1 * | 12/2021 | Flynn | H04N 19/182 |
| 2021/0407148 | A1 * | 12/2021 | Flynn | H04N 19/157 |
| 2022/0329858 | A1 * | 10/2022 | Zhang | H04N 19/597 |
| 2023/0059625 | A1 * | 2/2023 | Hur | G06T 9/40 |

OTHER PUBLICATIONS

Gumhold et al., "Predictive Point-Cloud Compression", MPI für Informatik Saarbrücken, 2005 (1 page total).

(Continued)

*Primary Examiner* — Anand P Bhatnagar
(74) *Attorney, Agent, or Firm* — Sughrue Mion, PLLC

(57) ABSTRACT

A method and apparatus for coding information of a point cloud may be performed by at least one processor and comprises: obtaining the point cloud including a set of points in a three-dimensional space; partitioning the point cloud into a tree structure comprising a plurality of nodes at different depths; encoding geometry information of the nodes; and encoding attribute information of the nodes before the entire point cloud is partitioned.

18 Claims, 13 Drawing Sheets

(56) References Cited

OTHER PUBLICATIONS

"HDL-64E S3, High Definition LiDAR Sensor, User's Manual and Programming Guide", 63-HDL64ES3 Rev J, Velodyne LiDAR, Inc., 2017 (54 pages total).

Mekuria et al., "Requirements for Point Cloud Compression", International Organisation for Standardisation Organisation Internationale De Normalisation, ISO/IEC JTC1/SC29/WG11 Coding of Moving Pictures and Audio, ISO/IEC JTC1/SC29/WG11 MPEG2016/n16330, Feb. 2016, Geneva, CH (3 pages total).

Tulvan et al., "Use Cases for Point Cloud Compression (PCC)", International Organisation for Standardisation Organisation Internationale De Normalisation, ISO/IEC JTC1/SC29/WG11, Coding of Moving Pictures and Audio, ISO/IEC JTC1/SC29/WG11 MPEG2015/ N16331, Jun. 2016, Geneva, CH (8 pages total).

Mammou et al., "G-PCC codec description v2", International Organisation for Standardisation Organisation Internationale De Normalisation, ISO/IEC JTC1/SC29/WG11, Coding of Moving Pictures and Audio, ISO/IEC JTC1/SC29/WG11 N18189, Jan. 2019, Marrakech, MA (39 pages total).

Zakharchenko et al., "V-PCC Codec description", International Organisation for Standardisation Organisation Internationale De Normalisation, ISO/IEC JTC1/SC29/WG11 Coding of Moving Pictures and Audio, ISO/IEC JTC1/SC29/WG11 MPEG2019/N18190, Jan. 2019, Marrakech, MA (38 pages total).

\* cited by examiner

1110 Obtain the point cloud including a set of points in a three-dimensional space 1120 Partition the point cloud into a tree structure comprising a plurality of nodes at different depths 1130 Encode geometry information of the nodes 1140 Encode attribute information of the nodes before the entire point cloud is partitioned

NODE-BASED GEOMETRY AND ATTRIBUTE CODING FOR A POINT CLOUD

CROSS-REFERENCE TO RELATED APPLICATION(S)

This application is a continuation of U.S. application Ser. No. 17/084,972, filed Oct. 30, 2020, which is based on and claims priority under 35 U.S.C. § 119 to U.S. Provisional Patent Application No. 62/972,155, filed Feb. 10, 2020, in the U.S. Patent & Trademark Office, the disclosure of which is incorporated by reference herein in its entirety.

BACKGROUND

Point cloud modeling has been widely used in recent years. For example, it is used in autonomous driving vehicles for object detection and localization, in geographic information systems (GIS) for mapping, and in cultural heritage projects to visualize and archive cultural heritage objects and collections, etc.

Point clouds contain a set of high dimensional points, typically of three dimensions (3D), each including 3D positional information and additional attributes such as color, reflectance, etc. The high dimensional points can be captured using multiple cameras and depth sensors, via Light Detection and Ranging (LIDAR) in various setups, and may be made up of thousands to billions of points, thereby allowing realistic representations of original scenes.

Compression technologies are needed to reduce the amount of data required to represent a point cloud for faster transmission and/or storage reduction. As explained in Non-Patent Literature 1 and Non-Patent Literature 2, the Moving Picture Experts Group (MPEG), a working group of the International Organization for Standardization (ISO) and the International Electrotechnical Commission (IEC), has created a joint technical committee (JTC 1/SC 29/WG 11) and an ad-hoc group (MPEG-PCC) to standardize compression techniques for static and/or dynamic point clouds.

Non-Patent Literature 1: Use Cases for Point Cloud Compression, ISO/IEC JTC1/SC29 WG11 Doc. N16331, Geneva, CH, June 2016.

Non-Patent Literature 2: Requirements for Point Cloud Compression, ISO/IEC JTC1/SC29 WG11 Doc. N16330, Geneva, CH, June 2016.

SUMMARY

The present disclosure is directed to Point Cloud Coding (PCC). As described herein, node-based geometry and attribute coding for a point cloud are disclosed.

According to an aspect of the disclosure a method for coding information of a point cloud may be performed by at least one processor and may comprise: obtaining the point cloud including a set of points in a three-dimensional space; partitioning the point cloud into a tree structure comprising a plurality of nodes at different depths; encoding geometry information of the nodes; and encoding attribute information of the nodes before the entire point cloud is partitioned.

According to an aspect of the disclosure, for each node at a given depth, of the plurality of nodes, the geometry information of the nodes at the given depth may be encoded before encoding the attribute information of the nodes at the given depth, and before geometry and attribute information of nodes at a different depth are encoded.

According to an aspect of the disclosure the geometry information and the attribute information may be alternatively and iteratively encoded.

According to an aspect of the disclosure, the aforementioned method may further comprise: transmitting generated bitstreams for both of the geometry information and the attribute information of the plurality of nodes, wherein the generated bitstreams may be transferable prior to completion of encoding of the geometry information of all of the nodes of the plurality of nodes of the point cloud.

According to an aspect of the disclosure at least one of the geometry information of the plurality of nodes and the attribute information of the plurality of nodes may be encoded without considering respective geometry information and attribute information of neighboring nodes of the plurality of nodes.

According to an aspect of the disclosure, at least one of the geometry information of the plurality of nodes and the attribute information of the plurality of nodes may be encoded considering respective geometry information and attribute information of neighboring nodes of the plurality of nodes.

According to an aspect of the disclosure, prior to the partitioning of the point cloud into a tree structure, the method may further comprise determining a size of the plurality of nodes.

According to an aspect of the disclosure, the geometry information of the plurality of nodes may be encoded using at least one of the following methods: octree coding with breadth-first traversal, octree coding with depth-first traversal, predictive tree-based coding, and tri-soup coding.

According to an aspect of the disclosure, the attribute information of the nodes may be encoded using at least one of the following methods: prediction-based attribute coding, lifting-based attribute coding, and region-based adaptive hierarchical transform (RAHT) coding.

According to an aspect of the disclosure, at least one of the encoding method of encoding the geometry information at the encoding method of encoding the attribute information may be signaled at a sequence level, frame level or slice level.

According to another aspect of the disclosure, an apparatus for coding information of a point cloud may comprise: at least one memory configured to store program code; and at least one processor configured to access the at least one memory and operate according to the computer program code; also the computer program code may comprise: obtaining code configured to cause the at least one processor to obtain the point cloud including a set of points in a three-dimensional space; partitioning code configured to cause the at least one processor to partition the point cloud into a tree structure comprising a plurality of nodes at different depths; first encoding code configured to cause the at least one processor to encode geometry information of the nodes; and second encoding code configured to cause the at least one processor to encode attribute information of the nodes before the entire point cloud is partitioned.

According to an aspect of the disclosure, for each node at a given depth, of the plurality of nodes, the first encoding code may be configured to cause the at least one processor to encode the geometry information of the nodes at the given depth before the second encoding code is configured to cause the at least one processor to encode the attribute information of the nodes at the given depth, and before the first encoding code and the second encoding code are respectively configured to cause the at least one processor to encode the geometry and the attribute information of nodes at a different depth.

According to an aspect of the disclosure, the first encoding code and the second encoding code may be configured to cause the at least one processor to alternatively and iteratively encode the respective geometry information and attribute information.

According to an aspect of the disclosure, the computer program code may further comprise generating code configured to cause the at least one processor to generate bitstreams for both of the geometry information and the attribute information of the plurality of nodes, and transmitting code configured to cause the at least one processor to transmit the generated bitstreams, wherein the generated bitstreams may be transferable prior to completion of encoding of the geometry information of all of the nodes of the plurality of nodes of the point cloud.

According to an aspect of the disclosure, the first encoding code and the second encoding code may be configured to cause the at least one processor to encode the respective geometry information and attribute information without considering respective geometry information and attribute information of neighboring nodes of the plurality of nodes.

According to an aspect of the disclosure, the first encoding code and the second encoding code may be configured to cause the at least one processor to encode the respective geometry information and attribute information considering respective geometry information and attribute information of neighboring nodes of the plurality of nodes.

According to an aspect of the disclosure, the computer program code may further comprise determining code configured to cause the at least one processor to determine a size of the plurality of nodes before the partitioning code is configured to partition the point cloud.

According to an aspect of the disclosure, the first encoding code may be configured to cause the at least one processor to encode the geometry information using at least one of the following methods: octree coding with breadth-first traversal, octree coding with depth-first traversal, predictive tree-based coding, and tri-soup coding.

According to an aspect of the disclosure the second encoding code may be configured to cause the at least one processor to encode the attribute information using at least one of the following methods: prediction-based attribute coding, lifting-based attribute coding, and region-based adaptive hierarchical transform (RAHT) coding.

According to another aspect of the disclosure, a non-transitory computer-readable storage medium may be provided, which stores instructions that may cause at least one processor to: obtain the point cloud including a set of points in a three-dimensional space; partition the point cloud into a tree structure comprising a plurality of nodes at different depths; encode geometry information of the nodes; and encode attribute information of the nodes before the entire point cloud is partitioned.

DETAILED DESCRIPTION

Point-Cloud Compression

As described in Non-Patent Literature 3 and Non-Patent Literature 4, in the Test Model 13 (TMC13) codec, promulgated by the MPEG, geometry information and associated attributes, such as color or reflectance, of points of a point cloud, are separately compressed. The geometry information, e.g., 3D coordinates of the points, is coded by octree-partitioning, quadtree partitioning, and binary partitioning, with occupancy information. After geometry the information is coded, the attributes are then compressed-based on reconstructed geometry using prediction, lifting, and region adaptive hierarchical transform techniques. For geometry coding, there are generally two approaches: (1) an octree-based approach, and (2) a predictive-tree-based approach.
Non-Patent Literature 3: G-PCC Codec description, ISO/IEC JTC1/SC29/WG11, Doc. N18891, October 2019.
Non-Patent Literature 4: Text of ISO/IEC CD 23090-9 Geometry-based Point Cloud Compression, ISO/IEC JTC1/SC29 WG11 Doc. N18478, Geneva, July 2019.

Octree-Based Geometry Coding

As disclosed herein, octree-based coding is a partitioning scheme approach wherein a point cloud can be partitioned by octree, quadtree or binary partitioning.

For example, for a given point cloud, having a bounding box B, the bounding box B is not necessarily restricted to have a same size in all directions. Indeed, it can be an arbitrary-sized rectangular cuboid, to better fit a shape of a 3D scene or objects.

Figure 1:
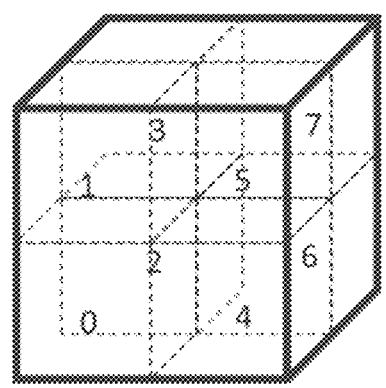
FIG. 1 is an illustration of an octree partition in three-dimensional space, according to embodiments.
Figure 2:
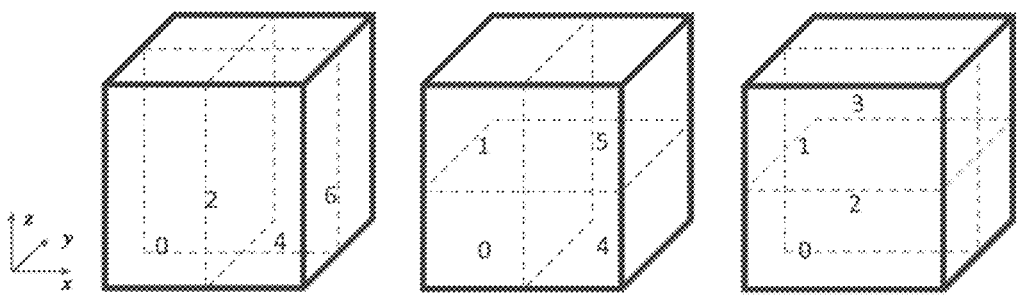
FIG. 2 is an illustration of a quadtree-partitioning scheme, according to embodiments.
Figure 3:
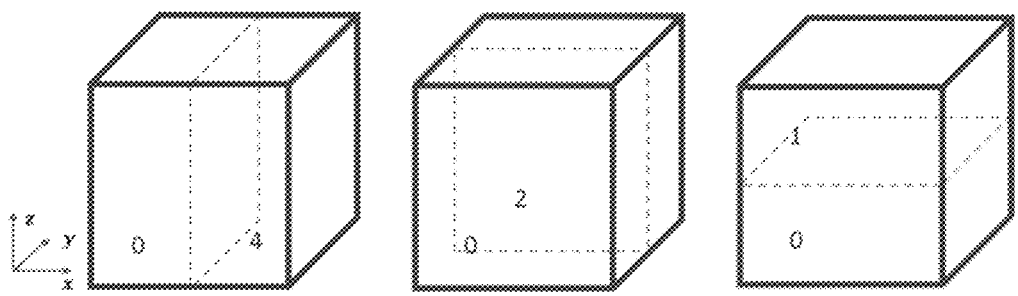
FIG. 3 is an illustration of a quad-tree partitioning scheme, according to embodiments.

According to embodiments, the size of B may be represented as a power of two, i.e., $(2^{d_x}, 2^{d_y}, 2^{d_z})$. According to embodiments, $d_x$, $d_y$, $d_z$ are not necessarily assumed to be equal. To partition a bounding box B, at least three types of partitioning methods can be utilized:
(1) Octree-partitioning, as shown in FIG. 1, where the x, y, z dimensions of the box may be divided in half, resulting 8 sub-boxes with the same size;

(2) Quadtree-partitioning, as shown in FIG. 2, where two of the three dimensions, e.g., x, y, z dimension, are split in half, resulting in 4 sub-boxes with the same size;

(3) Binary-tree partitioning, as shown in FIG. 3, where only one of the three dimension, e.g., x, y, z dimensions, is split in half, resulting in 2 sub-boxes with the same size.

According to embodiments, a point cloud may be represented by a general tree structure with an octree partition, a quadtree partition, and a binary tree partition. To traverse such a tree, a breadth-first approach may be adopted, as discussed in MPEG TMC13. Examples are disclosed in Non-Patent Literature 3 and 4. On the other hand, according to embodiments, a depth-first approach may also be utilized. This is illustrated in FIG. 4, wherein a shaded circle denotes an occupied node in the tree while a blank circle denotes an unoccupied node.

Figure 4:
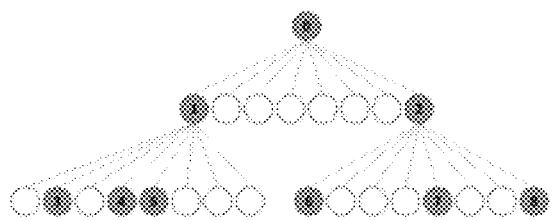
FIG. 4A is an illustration of a breadth-first traversal scheme, according to embodiments.
FIG. 4B is an illustration of a depth-first traversal scheme, according to embodiments.
Figure 4:
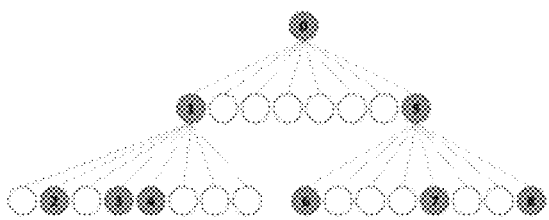

As illustrated in FIG. 4, the number in the circle may indicate the traversal order. In FIG. 4A, a breadth-first traversal order is shown, where nodes are visited/processed starting from a depth of 0, followed by depth 1, 2 and so forth. FIG. 4B shows a depth-first traversal order where nodes are visited/processed starting from a root node followed by its first occupied child and its own first occupied child until reaching the leaf nodes.

Predictive-Tree-Based Geometry Coding

Figure 5:
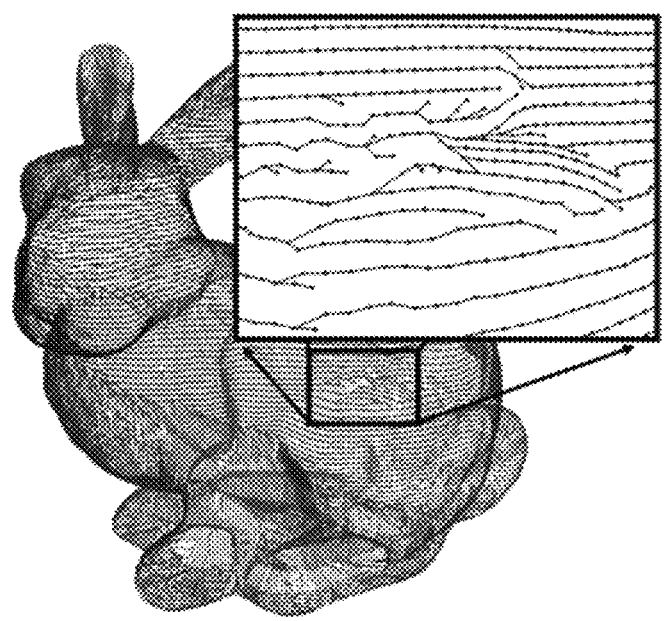
FIG. 5 is an illustration of a predictive tree, according to embodiments.

As disclosed herein predictive tree-based geometry coding may use a predictive tree, e.g., a tree spanning over all points in a point cloud. For prediction of a point, all ancestors can be used. For example, the position of a point can be predicted from the position of its parent point, or from the positions of its parent and its grandparent point. For example, FIG. 5 depicts a predictive tree that spans a point cloud of a rabbit. Specifically FIG. 5 depicts a predictive tree for a rabbit, where a magnified block shows a part of the tree.

Tri-Soup-Based Geometry Coding

Disclosed herein are techniques which use tri-soup-based geometry coding. This is a geometry coding approach which may represent an object's surfaces as a series of triangle mesh(es). According to embodiments, it may be applicable for a dense surface point cloud. According to embodiments, a tri-soup decoder may generate a point cloud from the mesh surface in a specified voxel granularity, so as to ensure density of the reconstructed point cloud. According to disclosed techniques, a tri-soup approach may introduce distortion to the original point cloud with the benefit of reduced bitstream size.

Prediction-Based Attribute Coding

Disclosed herein is a technique which may use prediction-based attribute coding. For simplicity, this technique assumes only one level of detail (LoD), however more detailed levels may be used.

According to this disclosed technique, let $(P_i)_{i=1 \ldots N}$ be the set of positions associated with the point cloud points and let $(M_i)_{i=1 \ldots N}$ be the Morton codes associated with $(P_i)_{i=1 \ldots N}$. Here, the points are first sorted according to their associated Morton codes in an ascending order. I may be the array of point indexes ordered according to this process. According to embodiments, an encoder/decoder may compress/decompress, respectively, the points according to the order defined by I. At each iteration i, a point $P_i$ may be selected. The distances of $P_i$ to the s (e.g., s=64) previous points may be analyzed and the k (e.g., k=3) nearest neighbors of $P_i$ may be selected for prediction. More precisely, the attribute values $(a_i)_{i \in 0 \ldots k-1}$ may be predicted by using a linear interpolation process-based on the distances of the nearest neighbours of point i. Let $\aleph_i$ be the set of the k-nearest neighbours of the current point i, and let $(\tilde{a}_j)_{j \in \aleph_i}$ be their decoded/reconstructed attribute values, with $(\delta_j)_{j \in \aleph_i}$ being their distances to the current point. Here, the predicted attribute value $\hat{a}_i$ may be given by:

$$\hat{a}_i = \text{Round}\left(\frac{1}{k} \sum_{j \in \aleph_i} \frac{\frac{1}{\delta_j^2}}{\sum_{j \in \aleph_i} \frac{1}{\delta_j^2}} \tilde{a}_j\right)$$

Lifting-Based Attribute Coding

Figure 6:
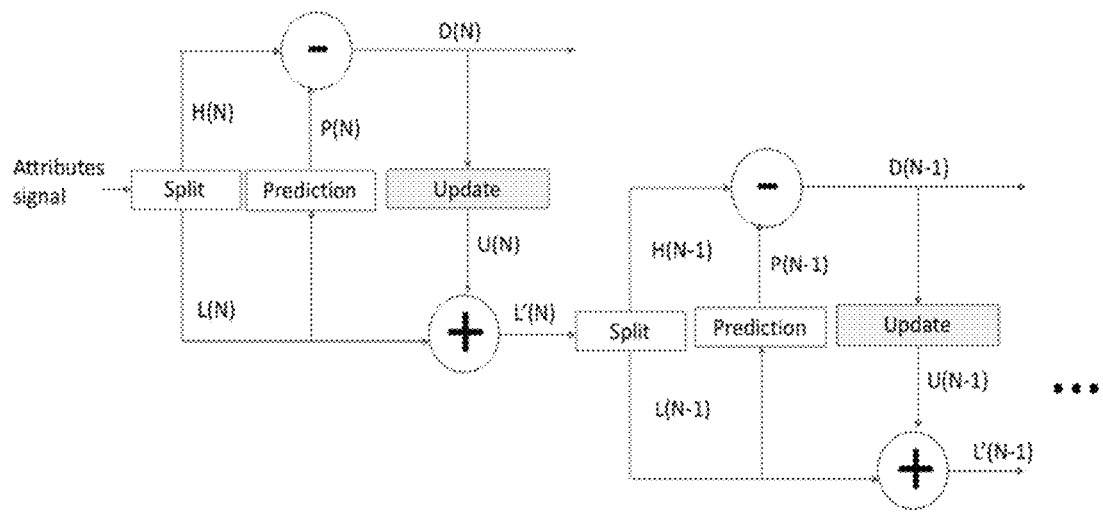
FIG. 6 is an illustration of a direct/forward transform in a lifting scheme, according to embodiments.
Figure 7:
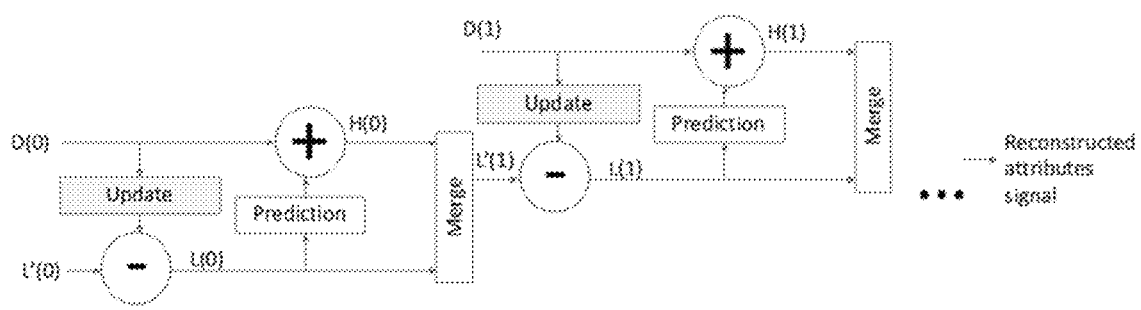
FIG. 7 is an illustration of an inverse transform in a lifting scheme, according to embodiments.

Disclosed herein are techniques for lifting-based attribute coding, which may be built upon a prediction-based coding method. A difference between lifting-based attribute coding and prediction-based coding, is that two additional steps may be introduced in lifting-based attribute coding: (1) updating of an operator and (2) use of an adaptive quantization strategy. An update operation strategy is shown in FIGS. 6 and 7. Specifically, FIG. 6 illustrates a direct/forward transform in the lifting scheme, and FIG. 7 illustrates an inverse transform in the lifting scheme.

Region Adaptive Hierarchical Transform (RAHT)-Based Attribute Coding

Figure 8:
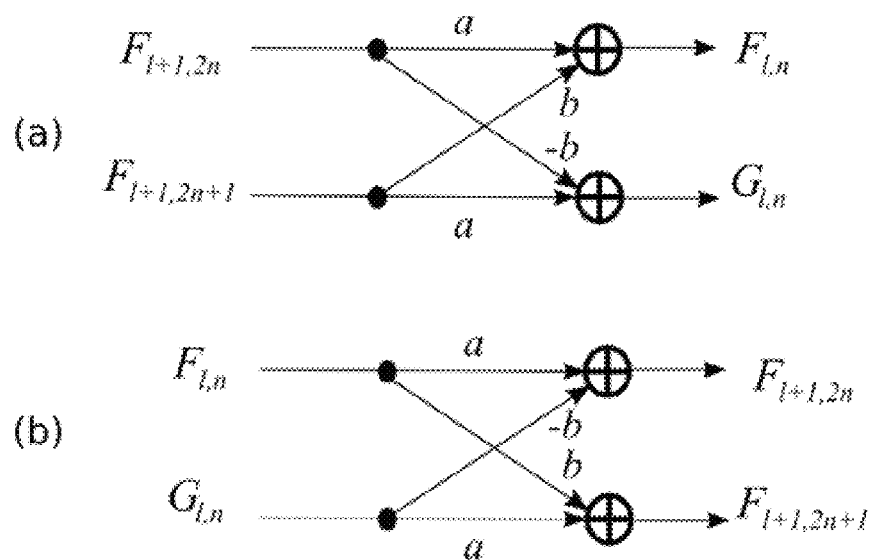
FIG. 8A is an illustration of region adaptive hierarchical transform (RAHT), according to embodiments.
FIG. 8B is an illustration of an inverse region adaptive hierarchical transform (RAHT), according to embodiments.

Disclosed herein are techniques which may use Region Adaptive Hierarchical Transforms (RAHTs). FIG. 8A illustrates a forward RAHT transform, and FIG. 8B illustrates an inverse RAHT transform. In FIGS. 8A and 8B, the transforms may employ the following equations:

$$a^2 = \frac{w_0}{w_0 + w_1} \text{ and } b^2 = \frac{w_1}{w_0 + w_1}.$$

Here, $w_0$ may be a notation of the weight of the input coefficient $F_{l+1,2n}$ while $w_1$ may be the same for $F_{l+1,2n+1}$.

As described in Non-Patent Literature 3 and Non-Patent Literature 4, in the Test Model 13 (TMC13) codec, promulgated by the MPEG, attribute coding may start after geometry coding of a whole point cloud is completed. However, according to these embodiments, it may be difficult to achieve low latency coding. Techniques, methods, and apparatuses to resolve this issue, and improve latency are disclosed as follows.

Non-Patent Literature 3: G-PCC Codec description, ISO/IEC JTC1/SC29/WG11, Doc. N18891, October 2019.

Non-Patent Literature 4: Text of ISO/IEC CD 23090-9 Geometry-based Point Cloud Compression, ISO/IEC JTC1/SC29 WG11 Doc. N18478, Geneva, July 2019.

The proposed methods and apparatuses may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. Further, the disclosures herein are not limited to uses related to TMC13 software or the MPEG-PCC standard.

Node-Based Geometry and Attribute Coding

Disclosed herein are techniques which may use tree-based geometry coding. According to this disclose, a point cloud may be represented as a general tree structure, e.g., including not only octree partitioning but also quad-tree and binary tree partitioning. The root of the tree may contain the whole volume of the point cloud, while the intermediate nodes of the tree may contain a sub-volume (or sub-tree) of the point cloud. According to the disclosure, the following notations may be used:

The root node is at a depth of 0 of the tree;
After one level of partitioning, the resulting nodes may be at a depth of 1 of the tree;
After k level of partitioning, the resulting nodes may be at a depth k of the tree, until all of the nodes are unit nodes, e.g., its size in all three dimensions may be 1.

Figure 9:
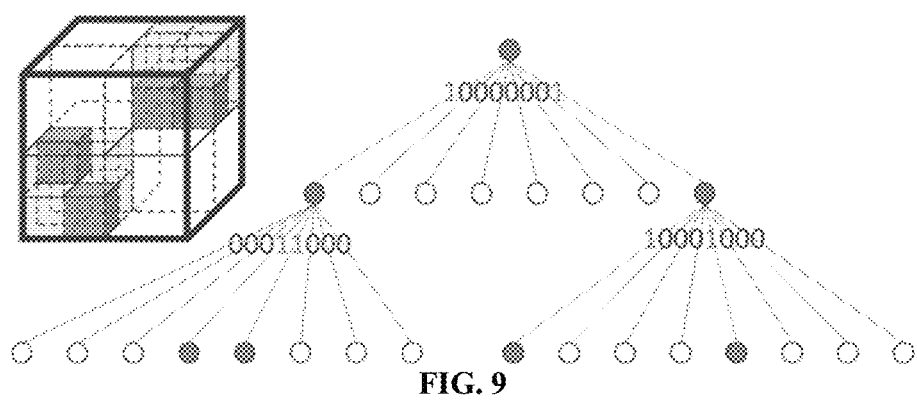
FIG. 9 is an illustration of an octree partition scheme, according to embodiments.
Figure 10:
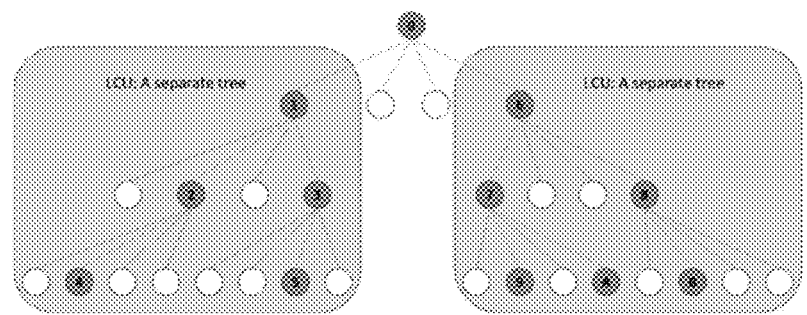
FIG. 10 is an illustration of a node-based geometric and attribute coding scheme, according to embodiments.

FIG. 9 illustrates an octree and the corresponding depth of nodes in the tree. According to the disclosure, instead of coding attributes after geometry coding is completed, in certain embodiments, the geometry of a point cloud is first encoded until a depth of k is reached, where k is specified by an encoder and transmitted in the bitstream. For each occupied node at depth k, which can be viewed as a sub-volume (or subtree) of the point cloud, the geometry information may be encoded first for all points in the node (subtree) followed by attribute coding of all points in the node. In the same or another embodiment, the geometry coding and attribute coding for all nodes in the node (subtree) may be performed in an interleaved fashion. In either approach, the nodes (subtree) at the depth of k may be treated as a top-level coding unit. This concept may be similar to the largest coding unit (LCU) used in the high efficiency video coding (HEVC) video coding standard. According to embodiments, each node at the depth of k form a separate tree and can be viewed as an LCU, which is shown as FIG. 10. FIG. 10 illustrates node-based (LCU-based) geometry and attribute coding. In FIG. 10, a quadtree is used (e.g. for simple illustrative purposes) and k is set to be equal to 1.

According to the disclosure, e.g., for simplicity, a node at the depth of k may be referred to an LCU, and the term may be used interchangeably.

According to embodiments, the generated bitstreams for both geometries and attributes of each node may be transmitted without waiting for the completion of the geometry coding of the whole point cloud. Also according to embodiments, a decoder can decode all the points in the corresponding node and can display them without waiting for the completion of the decoding of the geometry of the whole point cloud. In this way, low latency encoding and decoding can be achieved.

According to embodiments, occupied nodes at the depth k (LCU) may be coded in Morton order. According to the same or another embodiment, occupied nodes at the depth of k may be coded in other space-filling orders, e.g., other than Morton code.

According to embodiments, coding of geometries and attributes of an LCU may rely on information of its neighbors. For example, coding of geometries and attributes of an LCU does not necessarily depend on information of its neighboring LCU. To this end, predictions/references across LCU boundaries may be disabled and the context and history information may need to be reinitialized for each LCU. This may enable maximum parallelism at the depth of k, e.g., LCU level parallel encoding and decoding.

In another or same embodiment, coding of geometries and attributes of an LCU may rely on information of its already coded neighboring nodes and their coded child nodes. This may enable better compression efficiency.

Decision on Node Size

According to the disclosure, a point cloud encoder may need to decide the node size for node-based geometry and attribute coding. The node size may need to be signaled in a high-level syntax. The decision on node size may be made at the encoder side-based on different information.

According to embodiments, the node size may be determined based on the number of points in a node. For example, when the number of points in a node is smaller than or greater than a threshold, the node-based geometry and attribute coding may be enabled.

In the same or another embodiment, the node size may be determined by node density, where the node density is defined according to the following:

$$\text{node density} = \frac{\text{number of points in the node}}{\text{volume of the node}}$$

For example, when the node density is smaller than or greater than a threshold, the node-based geometry and attribute coding may be enabled.

Node-Based Quantization

According to the disclosure, quantization can be applied to a node to reduce the number of points to be coded or make the points within the node denser to enable more efficient compression. Details of node-based quantization schemes and corresponding signaling are disclosed below.

Decision on Different Geometry Coding Modes

According to the disclosure, for node-based geometry and attribute coding, a decision may need to be made regarding which geometry coding method is to be used, from among multiple options, including but not limited to the following:
Geometry Method 1: Octree coding with breadth-first traversal
Geometry Method 2: Octree coding with depth-first traversal
Geometry Method 3: Predictive tree-based coding
Geometry Method 4: Tri-soup coding According to an embodiment, only a subset of the above four geometry encoding methods, for example Geometry Methods 1 and 3, may be used in order to reduce encoder/decoder complexity. In the same or another embodiment, the geometry coding method may be fixed to be one method among the four options, e.g., to save the cost of selection.

According to an embodiment, it is possible to determine the geometry coding mode based on heuristics. For example, octree-based coding often works well for relatively dense point clouds, while a predictive tree-based approach works well for relatively less dense point clouds, such as those generated by via Light Detection and Ranging (LIDAR)

(e.g. as used in autonomous driving vehicles). Further, tri-soup coding may be more applicable for a dense surface point cloud.

According to the same or another embodiment, rate distortion optimization (RDO) may be used to determine the best geometry coding mode. Disclosed herein are techniques wherein the bitstream size and resulting distortion may be estimated, for example based on a measured by D1-PSNR, the total cost may be computed as follows:

total_cost(g)=distortion(g)+λ×bitstream_size(g)

Here, λ is be a weight factor used as a trade-off between distortion and bitstream size, g is the index of the geometry coding method, and g=1,2,3,4, etc. After calculating the total cost of all the geometry coding methods, the one with smallest cost may be selected as the coding method, shown as following:

$$g^* = \arg\min_g \text{total\_cost}(g)$$

Here, g* is the index of the optimal geometry coding method for a particular node. It should be noted that octree-based coding itself does not necessarily introduce a distortion in the geometry coding, while tri-soup coding may result in a distortion.

For predictive coding, according to an embodiment, the difference between a position of a point and its prediction may be found without quantization. In this case no geometry distortion will be introduced. In the same or another embodiment, the difference between the position of a point and its prediction may be quantized, and the difference may be quantized and encoded. In this case, geometry distortion may be introduced.

Decision on Different Attribute Coding Modes

According to the disclosure, besides decisions on geometry coding, decisions on which attribute coding method to be used, from among multiple options may also need to be decided. Options include, but are in no way not limited to the following:

Attribute Method 1: Prediction-based attribute coding
Attribute Method 2: Lifting-based attribute coding
Attribute Method 3: Region-based Adaptive Hierarchical Transform (RAHT)

According to an embodiment, only a subset of attribute coding methods, for example only Method 1 and 2, may be used. In the same or another embodiment, only a single attribute coding method may be used, to, e.g., reduce encoder/decoder complexity, while sometimes sacrificing certain compression efficiency.

According to an embodiment, the attribute coding method may be selected based on heuristics. For example, prediction and lifting methods often work well in relatively dense point clouds while RAHT works well in generally sparse point clouds.

In the same or another embodiment, embodiment, a rate distortion optimization (RDO) method can be used to choose the best attribute coding method, e.g., which has least RDO cost. In this approach, the bitstream size and the corresponding distortion may be estimated for all the points in a node, for example as measured by PSNR, and the total cost may be computed as follows:

total_cost(a)=distortion(a)+λ×bitstream_size(a)

Here, λ is a weight factor which may be used as a trade-off between distortion and bitstream size, a is the index of the geometry coding method, a=1,2,3, etc. After calculating the total cost of all of the attribute coding methods, the one with smallest cost may be chosen as the optimal coding method, shown as follows:

$$a^* = \arg\min_a \text{total\_cost}(a)$$

(a* is the index of the optimal geometry coding method for this node.)

Signaling of Node Size

According to the disclosure, the size of the node for node-based geometry and attribute coding may be signaled at the sequence level, frame level or on the slice level. The signaling may be introduced in a sequence parameter set, geometry parameter set or slice header.

According to the disclosure, the methods, apparatuses, and techniques disclosed herein are not limited to MPEG-PCC standards. However, MPEG-PCC may be used as follows for demonstrating signalling methods.

According to an embodiment, the size of the node for node-based geometry and attribute coding may be specified by gps_geometry_attribute_coding_nodesize_log 2_minus1 in the geometry parameter set in TMC13 as follows:

TABLE 1

Node Size

| geometry_parameter_set( ) { | Descriptor |
|---|---|
| gps_geom_parameter_set_id | ue(v) |
| ... | ... |
| log2_trisoup_node_size | ue(v) |
| gps_geometry_attribute_coding_nodesize_log2_minus1 | ue(v) |
| ... | ... |
| byte_alignment( ) | |
| } | |

Here, gps_geometry_attribute_coding_nodesize_log 2_minus1 specifies the size of the node for node-based geometry and attribute coding as follows: geometry_attribute_coding_node_size=2^(1+gps_geometry_attribute_coding_nodesize_log 2_minus1). If geometry_attribute_coding_node_size is equal to the size of the bounding box of the point cloud, the node may be the whole point cloud.

In the same or another embodiment, the octree depth at which all the nodes in this depth may have node-based geometry and attribute coding, is shown as follows:

TABLE 2

Node Depth

| geometry_parameter_set( ) { | Descriptor |
|---|---|
| gps_geom_parameter_set_id | ue(v) |
| ... | ... |
| log2_trisoup_node_size | ue(v) |
| gps_geometry_attribute_coding_node_depth_minus1 | ue(v) |
| ... | ... |
| byte_alignment( ) | |
| } | |

Here, (gps_geometry_attribute_coding_node_depth_minus1+1) specifies the octree depth at which all the nodes at a particular depth will have node-based geometry and attribute coding, where M is the total depth of the point cloud.

In the same or another embodiment, a flag, geometry_attribute_coding_node_present flag, is specified at each octree depth starting from depth 0. The flag is set to 0 until reaching the depth=(gps_geometry_attribute_coding_node_depth_minus1+1), wherein the flag is set to 1. For all depths>(gps_geometry_attribute_coding_node_depth_minus1+1), the flag may not be signalled.

Signaling of Geometry Coding Modes and Attribute Coding Modes

According to an embodiment, at least one of the geometry coding mode and the attribute coding mode can be signaled at the sequence level, frame level or slice level. The signaling may be introduced in a sequence parameter set, a geometry parameter set or a slice header. Using geometry parameter set as example, the signaling may be shown as follows:

TABLE 3

| Signalling | |
|---|---|
| geometry_parameter_set( ) { | Descriptor |
| gps_geom_parameter_set_id | ue(v) |
| . . . | . . . |
| log2_trisoup_node_size | ue(v) |
| gps_geometry_attribute_coding_nodesize_log2_minus1 | ue(v) |
| gps_geometry_coding_mode | u(2) |
| gps_attribute_coding_mode . . . | u(2) . . . |
| byte_alignment( ) | |
| } | |

Here, gps_geometry_coding_mode may specify the geometry coding method used for node-based geometry and attribute coding, as shown in the following table:

TABLE 4

| Coding Method | |
|---|---|
| gps_geometry_coding_mode | Geometry coding method |
| 0 | Octree coding with breadth-first traversal |
| 1 | Octree coding with depth-first traversal |
| 2 | Predictive tree coding |
| 3 | Tri-soup coding |

Here, gps_attribute_coding_mode specifies the attribute coding method used for node-based geometry and attribute coding, shown in the following table:

TABLE 5

| Coding Method | |
|---|---|
| gps_attribute_coding_mode | Attribute coding method |
| 0 | Prediction-based coding |
| 1 | Lifting-based coding |
| 2 | RAHT |

Here, the signaled geometry and attribute coding methods are applied to all the nodes at a specified node size, e.g., gps_geometry_attribute_coding_nodesize_log 2_minus1+1, in a sequence or frame if they are specified at sequence parameter set or geometry parameter set, respectively;

On the other hand, according to embodiments, the signaled geometry and attribute coding methods may be applied to all the nodes at specified node size in a slice if they are specified at slice header.

Note that according to embodiments u(2) denotes a 2-bit fixed length binarization with bypass coding. According to the same or another embodiment, gps_geometry_coding_mode and gps_attribute_coding_mode can be binarized using ue(v) and encoded with bypass coding. When ue(v) is used, the mapping between gps_geometry_coding_mode and its corresponding geometry coding method can be changed to reflect that more probable mode has a smaller mode value. A Similar principle may apply to gps_attribute_coding_mode and its corresponding attribute coding method.

In the same or another embodiment, geometry coding mode and attribute coding mode may be specified as follows:

TABLE 6

| Coding Method | |
|---|---|
| geometry_parameter_set( ) { | Descriptor |
| gps_geom_parameter_set_id | ue(v) |
| . . . | . . . |
| log2_trisoup_node_size | ue(v) |
| gps_geometry_attribute_coding_node_depth_minus1 | ue(v) |
| gps_geometry_coding_mode | u(2) |
| gps_attribute_coding_mode | u(2) |
| byte_alignment( ) | |
| } | |

Here, the signaled geometry and attribute coding applied to all the nodes at the specified octree depth, e.g., gps_geometry_attribute_coding_node_depth_minus1+1, in a sequence or frame if they are specified at a sequence parameter set or a geometry parameter set, respectively; On the other hand, according to embodiment, they may be applied to all the nodes at a specified octree depth in a slice if they are specified at a slice header.

Note that, according to embodiments, the geometry parameter set and the attribute parameter set may be separate, since geometry coding and attribute coding may be done separately. As disclosed herein, node-based geometry coding and attribute coding is proposed. According to embodiments, the two parameter sets may be merged into one set. However, also according to certain embodiments, new syntax elements may be used in this case as follows:
gps_geometry_attribute_coding_node_depth_minus1;
gps_geometry_attribute_coding_nodesize_log 2_minus1;
gps_geometry_coding_mode; and
gps_attribute_coding_mode As disclosed herein, in the geometry parameter set, these syntax elements may be applied to both geometry and attribute coding.

In the same or another embodiment, gps_geometry_coding_mode and gps_attribute_coding_mode may be signaled at a specified octree depth, e.g., gps_geometry_attribute_coding_node_depth_minus1+1 or at the specified octree node with node size equal to gps_geometry_attribute_coding_nodesize_log 2_minus1+1. In this way, node level geometry coding and attribute coding adaptation may be enabled. If the number of geometry coding methods is limited to only 1, at least gps_geometry_coding_mode may not be signaled and can be inferred. Similarly, if the number of attribute coding methods is limited to only 1, at least gps_attribute_coding_mode may not be signaled and can be inferred.

Figure 11:
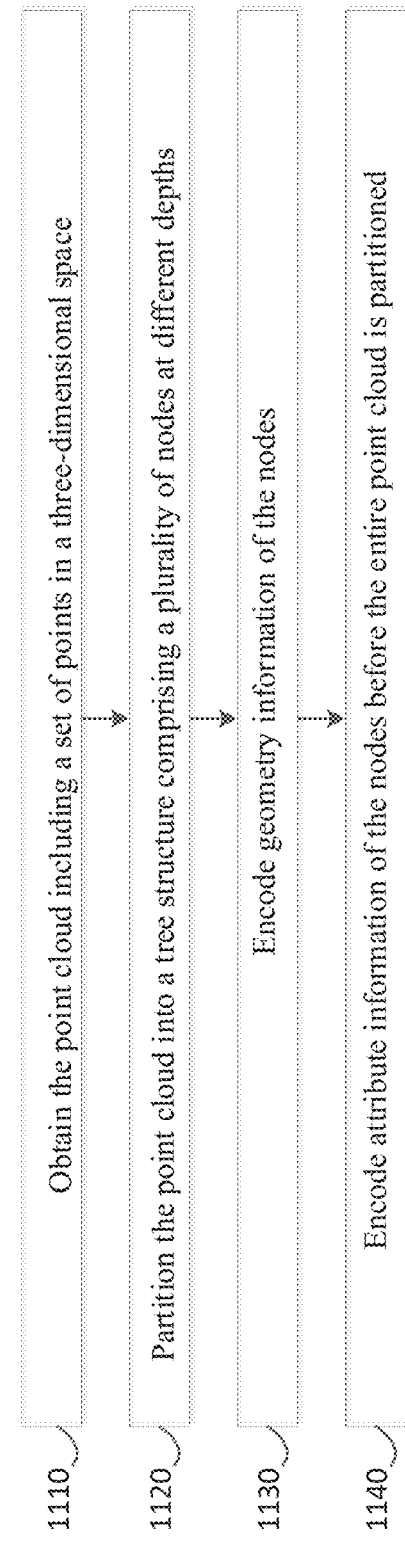
FIG. 11 is a flowchart of an example process for coding information of a point cloud

FIG. 11 is a flow chart of an example process 1100 for coding information of a point cloud. In some implementations, one or more process blocks of FIG. 11 may be performed by user device 1210. In some implementations, one or more process blocks of FIG. 11 may be performed by another device or a group of devices separate from or including user device 1210, such as platform 1220.

As shown in FIG. 11, process 1100 may include obtaining the point cloud including a set of points in a three-dimensional space (block 1110).

The point cloud may be a set of points in a 3D space, each with associated attributes, e.g. color, material properties, etc.

As further shown in FIG. 11, process 1100 may include partitioning the point cloud into a tree structure comprising a plurality of nodes at different depths (block 1120), encoding geometry information of the nodes (block 1130), and encoding attribute information of the nodes before the entire point cloud is partitioned (block 1140).

Figure 12:
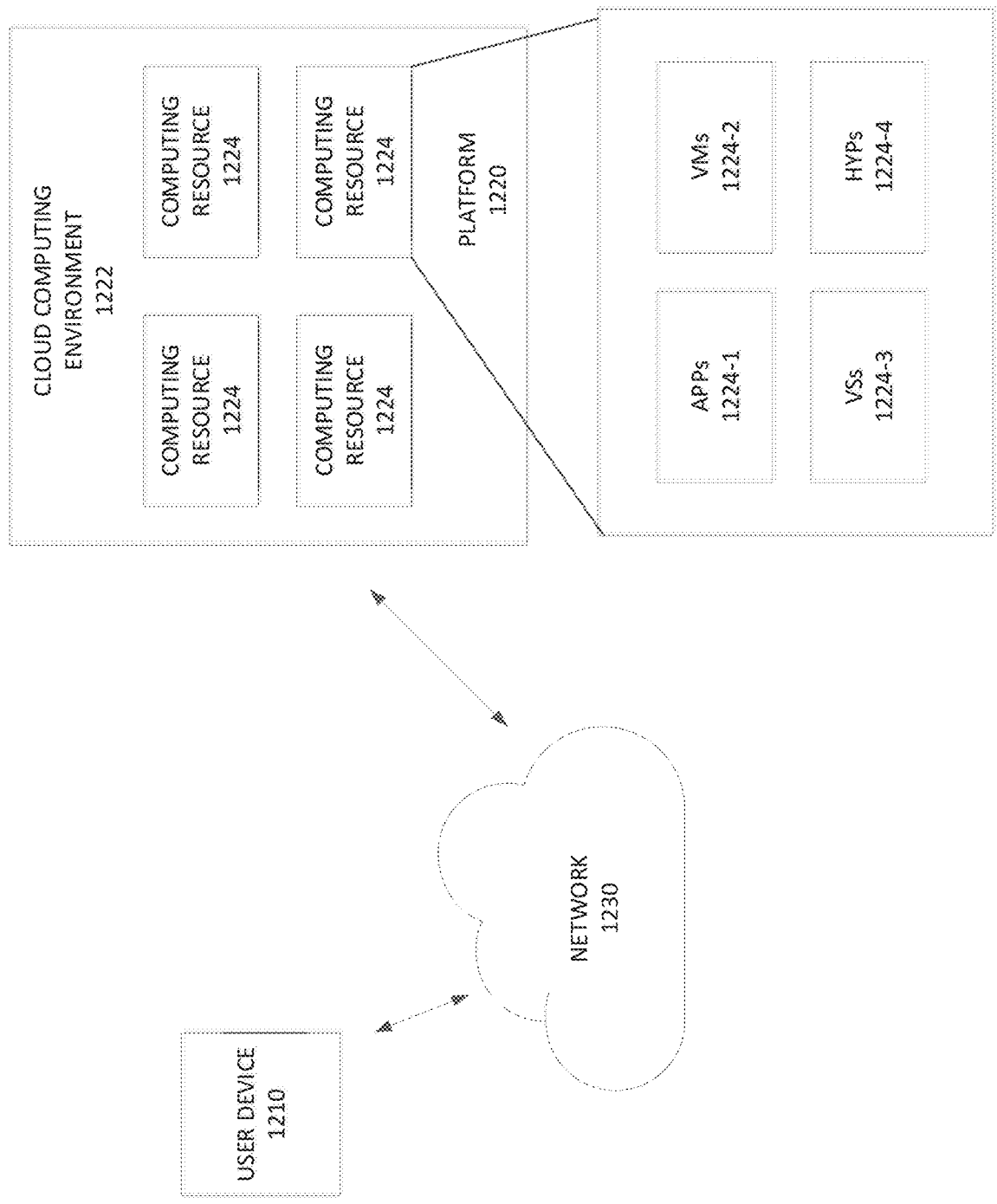
FIG. 12 is a diagram of an example environment in which systems and/or methods, described herein, may be implemented.

FIG. 12 is a diagram of an example communication system 1200 in which systems and/or methods, described herein, may be implemented. As shown in FIG. 12, communication system 1200 may include a user device 1210, a platform 1220, and a network 1230. Devices of communication system 1200 may interconnect via wired connections, wireless connections, or a combination of wired and wireless connections.

The communication system 1200 may support unidirectional transmission of data. For example, a first user device 1210 may code video data at a local location for transmission to a second user device 1210 via the network 1230. The second user device 1210 may receive the coded video data of the first user device 1210 from the network 1230, decode the coded data and display the recovered video data. Unidirectional data transmission may be common in media serving applications, and the like.

The communication system 1200 may support bidirectional transmission of data. For example, the communication system 1200 may support bidirectional transmission of coded video that may occur, for example, during videoconferencing. For bidirectional transmission of data, each user device 1210 may code video data captured at a local location for transmission to the other user device 1210 via the network 1230. Each user device 1210 also may receive the coded video data transmitted by the other user device 1210, may decode the coded data and may display the recovered video data at a local display device.

User device 1210 includes one or more devices capable of receiving, generating, storing, processing, and/or providing information associated with platform 1220. For example, user device 1210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 1210 may receive information from and/or transmit information to platform 1220.

Platform 1220 includes one or more devices capable of providing information to user device 1210, as described elsewhere herein. In some implementations, platform 1220 may include a cloud server or a group of cloud servers. In some implementations, platform 1220 may be designed to be modular such that certain software components may be swapped in or out depending on a particular need. As such, platform 1220 may be easily and/or quickly reconfigured for different uses.

In some implementations, as shown, platform 1220 may be hosted in cloud computing environment 1222. Notably, while implementations described herein describe platform 1220 as being hosted in cloud computing environment 1222, in some implementations, platform 1220 is not be cloud-based (i.e., may be implemented outside of a cloud computing environment) or may be partially cloud-based.

Cloud computing environment 1222 includes an environment that hosts platform 1220. Cloud computing environment 1222 may provide computation, software, data access, storage, etc. services that do not require end-user (e.g., user device 1210) knowledge of a physical location and configuration of system(s) and/or device(s) that hosts platform 1220. As shown, cloud computing environment 1222 may include a group of computing resources 1224 (referred to collectively as "computing resources 1224" and individually as "computing resource 1224").

Computing resource 1224 includes one or more personal computers, workstation computers, server devices, or other types of computation and/or communication devices. In some implementations, computing resource 1224 may host platform 1220. The cloud resources may include compute instances executing in computing resource 1224, storage devices provided in computing resource 1224, data transfer devices provided by computing resource 1224, etc. In some implementations, computing resource 1224 may communicate with other computing resources 1224 via wired connections, wireless connections, or a combination of wired and wireless connections.

As further shown in FIG. 12, computing resource 1224 includes a group of cloud resources, such as one or more applications ("APPs") 1224-1, one or more virtual machines ("VMs") 1224-2, virtualized storage ("VSs") 1224-3, one or more hypervisors ("HYPs") 1224-4, or the like.

Application 1224-1 includes one or more software applications that may be provided to or accessed by user device 1210. Application 1224-1 may eliminate a need to install and execute the software applications on user device 1210. For example, application 1224-1 may include software associated with platform 1220 and/or any other software capable of being provided via cloud computing environment 1222. In some implementations, one application 1224-1 may send/receive information to/from one or more other applications 1224-1, via virtual machine 1224-2.

Virtual machine 1224-2 includes a software implementation of a machine (e.g., a computer) that executes programs like a physical machine. Virtual machine 1224-2 may be either a system virtual machine or a process virtual machine, depending upon use and degree of correspondence to any real machine by virtual machine 1224-2. A system virtual machine may provide a complete system platform that supports execution of a complete operating system ("OS"). A process virtual machine may execute a single program, and may support a single process. In some implementations, virtual machine 1224-2 may execute on behalf of a user (e.g., user device 1210), and may manage infrastructure of cloud computing environment 1222, such as data management, synchronization, or long-duration data transfers.

Virtualized storage 1224-3 includes one or more storage systems and/or one or more devices that use virtualization techniques within the storage systems or devices of computing resource 1224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1224-4 may provide hardware virtualization techniques that allow multiple operating systems (e.g., "guest operating systems") to execute concurrently on a host computer, such as computing resource 1224. Hypervisor 1224-4 may present a virtual operating platform to the guest operating systems, and may manage the execution of the guest operating systems. Multiple instances of a variety of operating systems may share virtualized hardware resources.

Network 1230 includes one or more wired and/or wireless networks. For example, network 1230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 12 are provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 1200.

Figure 13:
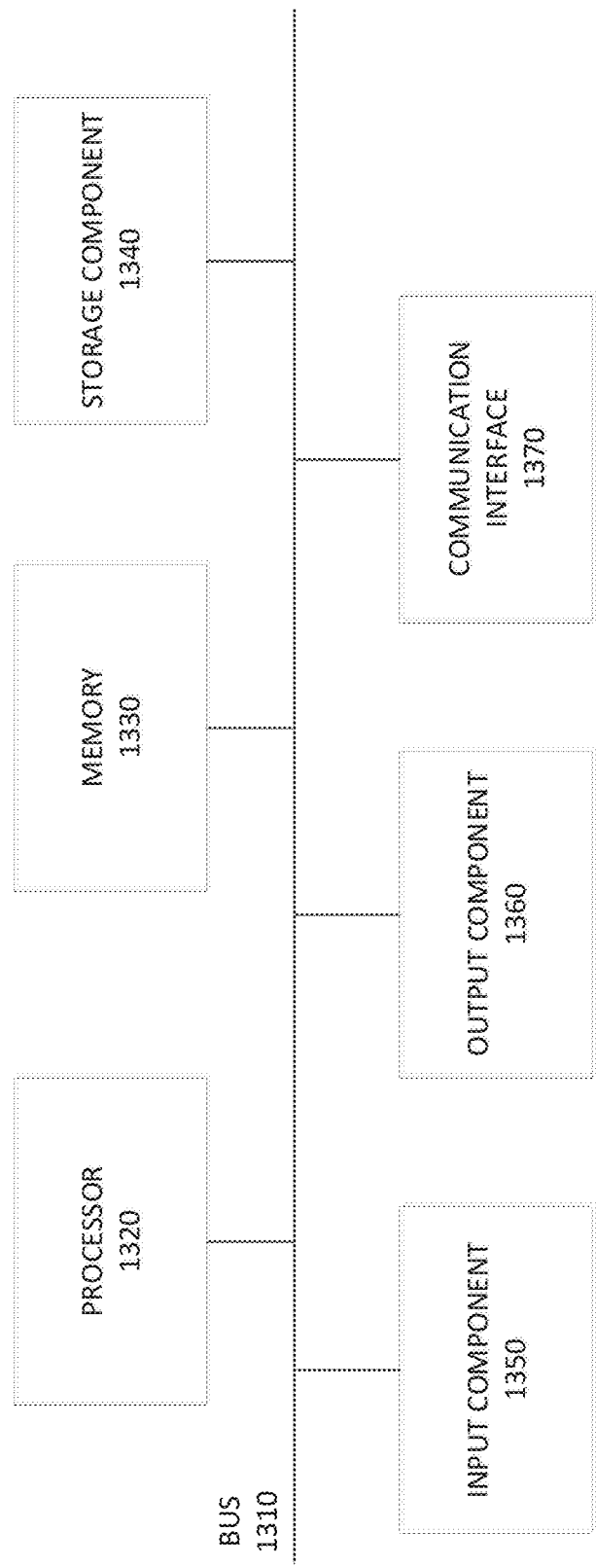
FIG. 13 is a diagram of example components of one or more devices of FIG. 8.

FIG. 13 is a diagram of example components of a device 1300. Device 1300 may correspond to user device 1210 and/or platform 1220. As shown in FIG. 13, device 1300 may include a bus 1310, a processor 1320, a memory 1330, a storage component 1340, an input component 1350, an output component 1360, and a communication interface 1370.

Bus 1310 includes a component that permits communication among the components of device 1300. Processor 1320 is implemented in hardware, firmware, or a combination of hardware and software. Processor 1320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1320 includes one or more processors capable of being programmed to perform a function. Memory 1330 includes a random access memory (RAM), a read only memory (ROM), and/or another type of dynamic or static storage device (e.g., a flash memory, a magnetic memory, and/or an optical memory) that stores information and/or instructions for use by processor 1320.

Storage component 1340 stores information and/or software related to the operation and use of device 1300. For example, storage component 1340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1350 includes a component that permits device 1300 to receive information, such as via user input (e.g., a touch screen display, a keyboard, a keypad, a mouse, a button, a switch, and/or a microphone). Additionally, or alternatively, input component 1350 may include a sensor for sensing information (e.g., a global positioning system (GPS) component, an accelerometer, a gyroscope, and/or an actuator). Output component 1360 includes a component that provides output information from device 1300 (e.g., a display, a speaker, and/or one or more light-emitting diodes (LEDs)).

Communication interface 1370 includes a transceiver-like component (e.g., a transceiver and/or a separate receiver and transmitter) that enables device 1300 to communicate with other devices, such as via a wired connection, a wireless connection, or a combination of wired and wireless connections. Communication interface 1370 may permit device 1300 to receive information from another device and/or provide information to another device. For example, communication interface 1370 may include an Ethernet interface, an optical interface, a coaxial interface, an infrared interface, a radio frequency (RF) interface, a universal serial bus (USB) interface, a Wi-Fi interface, a cellular network interface, or the like.

Device 1300 may perform one or more processes described herein. Device 1300 may perform these processes in response to processor 1320 executing software instructions stored by a non-transitory computer-readable medium, such as memory 1330 and/or storage component 1340. A computer-readable medium is defined herein as a non-transitory memory device. A memory device includes memory space within a single physical storage device or memory space spread across multiple physical storage devices.

Software instructions may be read into memory 1330 and/or storage component 1340 from another computer-readable medium or from another device via communication interface 1370. When executed, software instructions stored in memory 1330 and/or storage component 1340 may cause processor 1320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 13 are provided as an example. In practice, device 1300 may include additional components, fewer components, different components, or differently arranged components than those shown in FIG. 13. Additionally, or alternatively, a set of components (e.g., one or more components) of device 1300 may perform one or more functions described as being performed by another set of components of device 1300.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for decoding information of a point cloud, the method performed by at least one processor and comprising:
   decoding attribute information of a plurality of nodes of the point cloud;
   decoding geometry information of the plurality of nodes;
   de-partitioning a tree structure of the point cloud at different depths; and
   obtaining the point cloud including a set of points in a three-dimensional space,
   receiving generated bitstreams for both of the geometry information and the attribute information of the plurality of nodes, and
   wherein decoding of the geometry information of all of the nodes of the plurality of nodes of the point cloud begins prior to receipt of the entire generated bitstreams.

2. The method of claim 1, wherein for each node at a given depth, of the plurality of nodes,
   the attribute information of the nodes at the given depth is decoded before the geometry information of the nodes at the given depth is decoded; and
   both the attribute information and the geometry information of the nodes at the given depth are decoded before attribute information and geometry information of nodes at a different depth are decoded.

3. The method of claim 1, wherein the geometry information and the attribute information are alternatively and iteratively decoded.

4. The method of claim 1, wherein at least one of the geometry information of the plurality of nodes and the attribute information of the plurality of nodes is decoded without considering respective geometry information and attribute information of neighboring nodes of the plurality of nodes.

5. The method of claim 1, wherein at least one of the geometry information of the plurality of nodes and the attribute information of the plurality of nodes is decoded considering respective geometry information and attribute information of neighboring nodes of the plurality of nodes.

6. The method of claim 1, further comprising determining a size of the plurality of nodes following de-partitioning the tree structure of the point cloud.

7. The method of claim 1, wherein the geometry information of the plurality of nodes is decoded using at least one of the following methods: octree decoding with breadth-first traversal, octree decoding with depth-first traversal, predictive tree-based decoding, and tri-soup decoding.

8. The method of claim 1, wherein the attribute information of the nodes is decoded using at least one of the following methods: prediction-based attribute decoding, lifting-based attribute decoding, and region-based adaptive hierarchical transform (RAHT) decoding.

9. The method of claim 1, wherein at least one of the decoding of the geometry information and the decoding of the attribute information is signaled at a sequence level, frame level or slice level.

10. An apparatus for decoding information of a point cloud, the apparatus comprising:
    at least one memory configured to store program code; and
    at least one processor configured to access the at least one memory and operate according to the computer program code, the computer program code configured to cause the at least one processor to:
    decode attribute information of a plurality of nodes of the point cloud;
    decode geometry information of the plurality of nodes;
    de-partition a tree structure of the point cloud at different depths; and
    obtain the point cloud including a set of points in a three-dimensional space,
    wherein the computer program code is configured to cause the at least one processor to:
    receive generated bitstreams for both of the geometry information and the attribute information of the plurality of nodes; and
    begin decoding of the geometry information of all of the nodes of the plurality of nodes of the point cloud prior to receipt of the entire generated bitstreams.

11. The apparatus of claim 10, wherein the computer program code is configured to cause the at least one processor to, for each node at a given depth, of the plurality of nodes,
    decode the attribute information of the nodes at the given depth before decoding the geometry information of the nodes at the given depth; and
    decode both the attribute information and the geometry information of the nodes at the given depth before decoding attribute information and geometry information of nodes at a different depth.

12. The apparatus of claim 10, wherein the computer program code is configured to cause the at least processor to alternatively and iteratively decode the geometry information and the attribute information.

13. The apparatus of claim 10, wherein the computer program code is further configured to cause the at least one processor to decode the respective geometry information and attribute information without considering respective geometry information and attribute information of neighboring nodes of the plurality of nodes.

14. The apparatus of claim 10, wherein the computer program code is further configured to cause the at least one processor to decode the respective geometry information and attribute information considering respective geometry information and attribute information of neighboring nodes of the plurality of nodes.

15. The apparatus of claim 10, wherein the computer program code is further configured to cause the at least one processor to determine a size of the plurality of nodes following de-partitioning the tree structure of the point cloud.

16. The apparatus of claim 10, wherein the computer program code is further configured to cause the at least one processor to decode the geometry information using at least one of the following methods: octree decoding with breadth-first traversal, octree decoding with depth-first traversal, predictive tree-based decoding, and tri-soup decoding.

17. The apparatus of claim 10, wherein the computer program code is further configured to cause the at least one processor to decode the attribute information using at least one of the following methods: prediction-based attribute decoding, lifting-based attribute decoding, and region-based adaptive hierarchical transform (RAHT) decoding.

18. A non-transitory computer-readable storage medium storing instructions that cause at least one processor to decode information of a point cloud by:
   decoding attribute information of a plurality of nodes of the point cloud;
   decoding geometry information of the plurality of nodes;
   de-partitioning the tree structure of the point cloud at different depths; and
   obtaining the point cloud including a set of points in a three-dimensional space,
   receiving generated bitstreams for both of the geometry information and the attribute information of the plurality of nodes, and
   wherein decoding of the geometry information of all of the nodes of the plurality of nodes of the point cloud begins prior to receipt of the entire generated bitstreams.

* * * * *